United States Patent

[11] 3,589,784

| [72] | Inventor | Willhelm Winkels 55 Edenvale Crescent Islington, Ontario, Canada |
|---|---|---|
| [21] | Appl. No. | 844,061 |
| [22] | Filed | July 23, 1969 |
| [45] | Patented | June 29, 1971 |

[54] MODULAR ASSEMBLY CONSTRUCTION
20 Claims, 2 Drawing Figs.

[52] U.S. Cl. .................................................. 312/263
[51] Int. Cl. ................................................ A47b 47/00
[50] Field of Search .......................................... 312/263—265; 108/64; 289/20—92, 36

[56] References Cited
UNITED STATES PATENTS

| 1,966,928 | 7/1934 | Friedel ........................ | 108/64 |
| 2,501,980 | 3/1950 | Wolfe ........................... | 220/4 |
| 3,269,788 | 8/1966 | Kneer ........................... | 312/265 X |

FOREIGN PATENTS

| 979,082 | 4/1951 | France ......................... | 312/264 |

*Primary Examiner*—Jordan Franklin
*Assistant Examiner*—George V. Larkin
*Attorney*—Westell & Hanley ABSTRACT: A modular assembly extendible in one direction uses first members extending in such direction and second members perpendicular thereto, where a rod extends through a bore in a first member to allow second members to be clamped to each end thereof in a manner preventing translation or rotation of a second member relative to a first.

INVENTOR
WILLHELM WINKELS

MODULAR ASSEMBLY CONSTRUCTION

This invention relates to a modular assembly construction suitable for the construction of a structure to varying lengths through use of a varying number of modular units, such construction being eminently suitable for the construction of a row of cabinets or horizontal or vertical shelving units.

The invention provides for the assembly of any desired number of modular units in a row, the row defining the modular extension direction. A modular unit comprises a first member extending in the modular extension direction and a second member perpendicular thereto. Aligned bores in the first and second member allow the threaded connection of a rod and coupling means, with the major extent of the rod lying in the first member bore and with an extent of the assembled rod and coupling member extending through the second member bore. The coupling means and first and second members are so designed and constructed, that with means limiting the movement of the rod relative to the first member toward the coupling member, the coupling member may be screwed relative to the rod, to clamp the first member and second member into rigid relationship. As part of the rigid relationship, the coupling member is provided with means to prevent the movement of either of the coupled members in a direction transverse to the modular extension direction. Preferably this is achieved by a member attached to the rod and in close sliding fit with the defining walls of the bores in both the first and second coupling members. As part of the rigid relationship, the coupling member is provided with means to prevent rotation of the first and second members relative to one another about an axis at an angle to the rod direction. Preferably the means comprises a planar end face on the first member and a planar side face on the second member clamped thereto, together with a shoulder on the coupling member which bears upon a shoulder on the second member to move on proper rotation of the coupling member on the rod, and through the shoulders, the planar surfaces into clamping contact.

Rotation between first and second clamped members about an axis parallel to the rod direction is prevented usually by having a first members clamped in two locations to the same second member and means fixing the first members against movement relative to each other.

The modular unit construction is extendable to include as many units as desired. A rigid construction is formed by a first member, with a bore therethrough, and a rod in the bore, clamped to a second member at each end by the clamping means as already described. This may be considered as a modular unit comprising first and second members plus an extra second member. When more modular units are to be added, the coupling member on the side where more units are to be added is provided with means for threadedly connecting thereto a rod for extension through the bore of the first member of the next modular unit and for connection with a clamping means, to clamp the second member of the next modular unit thereto. If further modular units are to be added, then the end-clamping means in the addition direction is threaded to receive a further rod, and so on.

In drawings which illustrate a preferred embodiment of the invention:

Figure 1:
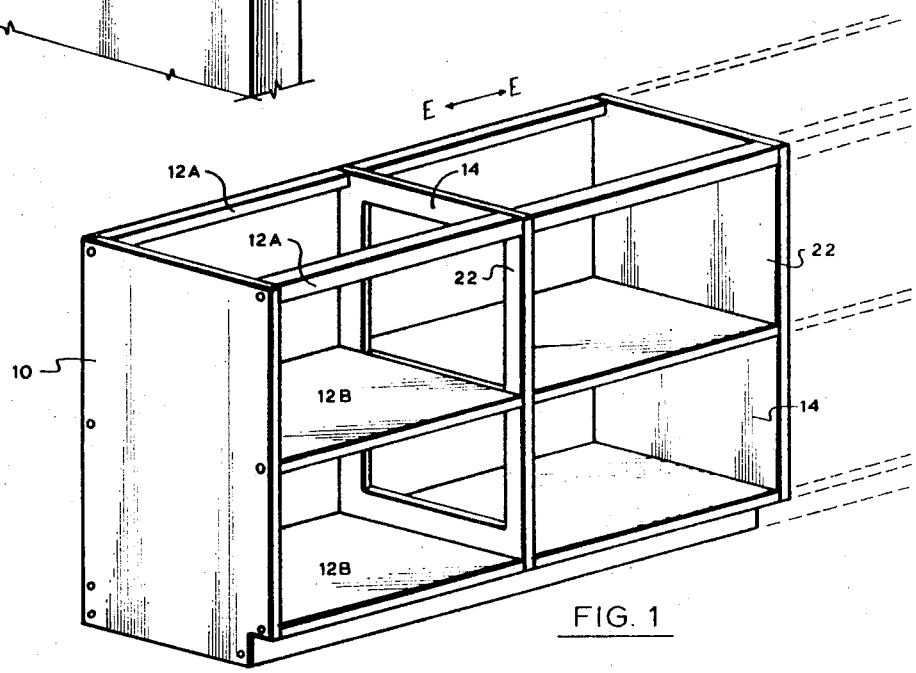
FIG. 1 is a perspective of modular units formed in accord with the invention.

FIG. 1 shows the framework for a kitchen cabinet construction having an end face and second member 10 to which modular units will be attached in the modular extension direction E—E, such modular units comprising first members 12A and 12B, (which may be made of wood, pressed board or other material), extending in the extension direction and second members 14 extending perpendicular thereto. It will be noted that members 12A are rodlike and members 12B are shelflike but it will be understood from a discussion of the detailed construction of the preferred embodiment that these members are equivalent for carrying out the purposes of the invention.

FIG. 1 shows the lower shelf undercut to form a recess but, as will be understood, this arrangement does not affect the operation of the invention. Moreover, to the inventive elements shown, it will be understood that there would be added members characteristic of the function of the modularly assembled units. For example, assuming the construction shown is for a kitchen cabinet, a top counter, doors, or drawers, and interior shelving may be added to the invention framework shown in FIG. 1.

Figure 2:
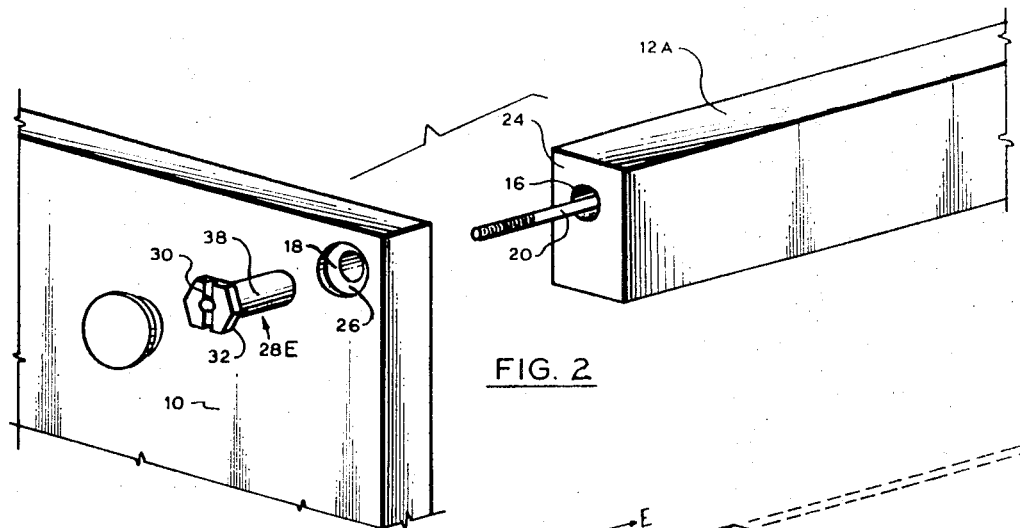
FIG. 2 is an enlargement of an end coupling of such unit.
Figure 3:
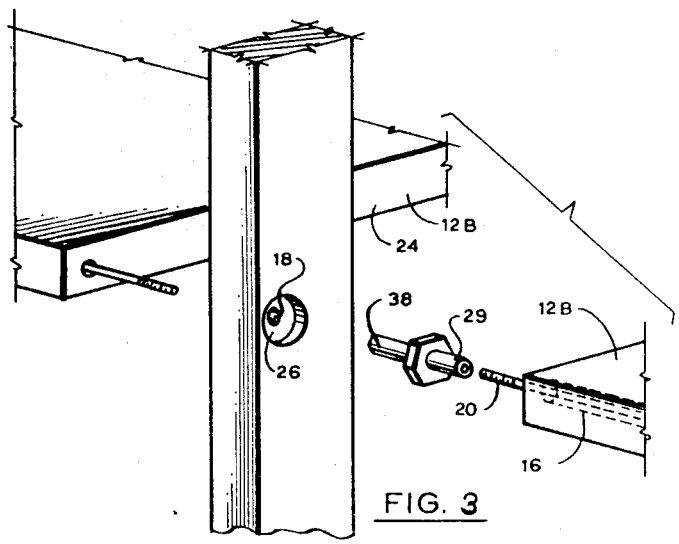
FIG. 3 is an enlargement of an intermediate coupling for such unit.
Figure 4:
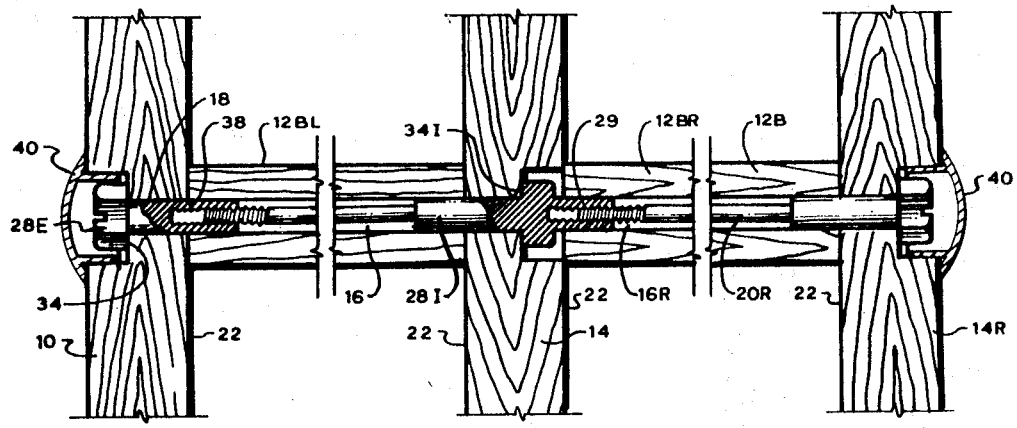
FIG. 4 is a vertical cross section through a rod taken in the modular extension direction.

As shown in FIGS. 2, 3 and 4, each of the members 12B is provided with bores 16 therethrough, extending in the modular extension direction. Each of the members 10 or 14 is provided with a bore 18 therethrough for alignment with a bore 16. A rod 20 is provided to extend along bore 16 to locations adjacent each end thereof. The members 10 and 14 on the one hand and 12A or 12B on the other hand are preferably provided with mutually contacting planar surfaces 22 and 24 respectively, extending in a direction perpendicular to the axis bore 16 and the modular extension direction. As shown in FIGS. 2, 3 or 4 bore 18 is enlarged on the side of a member 10 or 14 remote from the member 12A or 12B to which it is clamped to form shoulders 26 facing away from such member 10 or 14.

As shown in FIG. 2, and the left hand side of FIG. 4 a coupling member 28E is provided for threading connection with the rod 20 so that if the rod 20 is stationary in the bore, the coupling member 28E may be rotated to move in contracting threading direction relative to the rod 20. Any desired means may be provided to allow for manual rotation of the coupling member in either direction, including the screwdriver groove 30 or the hexagonal outline shown. The coupling member 28E is provided with shoulders 34 facing the rod 20 to which the coupling member is to be connected and designed to bear on shoulders 26 to move the second member 10 or 14 into clamping engagement with member 12A or 12B when the coupling member 28 is screwed onto rod 20. A shank 38 on coupling member 28E extending from shoulders 30 toward the rod 20 in the threaded assembly position, is dimensioned to make a close sliding fit with the walls defining bores 18 and 16 to retain the members 10 and 12B (or 10 and 12A) against movement transverse to the rod.

Adjacent the other end of the rod 20 from the end coupling 28E is an intermediate coupling member 28I comprising a coupling member similarly shaped to 28E having shoulders 34I facing the first coupling member 28E for cooperation with shoulders 26 on member 14 on the opposite end of member 12B from the end coupling member. The rod 20 is shown as integrally extending from coupling member 28I. However as will be realized from an examination of FIG. 5 these members may be made separately and threaded together or the rod might form an integral extension of member 28E.

Figure 5:
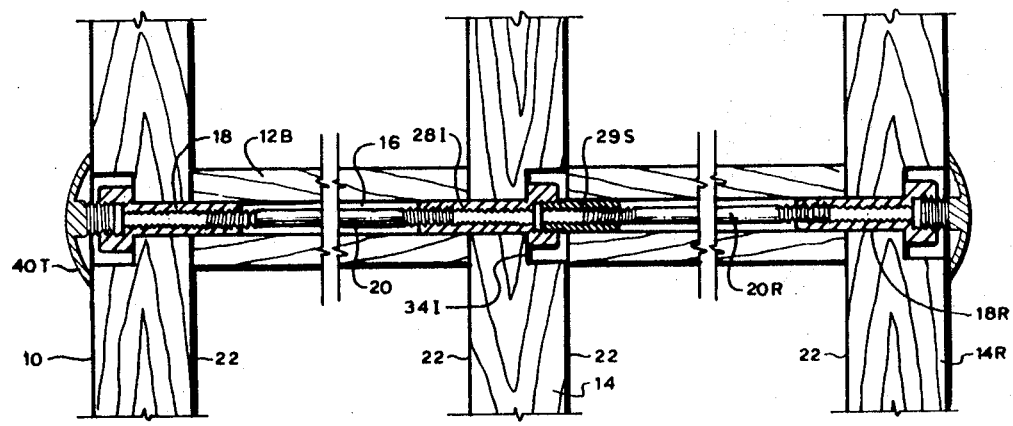
FIG. 5 is a vertical construction showing an alternative construction to that shown in FIG. 4.

The central member 14 and the members 12A or 12B extending leftward therefrom in FIG. 4 or 5 may be considered as a modular unit, with the first of such units having an extra second member 10 coupled to the left-hand side of the first members. To assemble the first modular unit, the two members 10 and 14 are placed at each end of the members 12B and for each bore in the bracketed member 12B, a rod 16 is threaded into a coupling member 28 and the rod is then moved rightward in FIG. 4, through bore 16 and then into bore 18. A second member 14 is then applied to the right hand end of the member 12B and a coupling member 28I has its shank inserted through the bore 18 in the member 14 and the coupling member 28I is then tightened until the two end members 10 and 14 are finally clamped to member 12B, where at each end of member 12B the clamped members are, held against transverse movement by the respective shanks 38 in the bores 18 and 16 and the clamped members are held against rotational movement about other than the rod axis by the clamping of a member 10 or 14 between shoulders 34 and 26 of the coupling member and the planar faces of the clamped members.

As indicated in FIG. 4 the outer face of end member 10 may, at the aperture formed by the enlarged bore, be closed by a frictionally attached cap 40 of plastic or the like.

By way of alternative, the corresponding location in FIG. 5 shows a threaded rod bore extending through the coupling member and an enlarged threaded bore at the outside end to threadedly attach an end cap 40T.

Returning to FIG. 4, assuming a further modular unit, comprising a member 12BR and a member 14R is to be added, (the R is added to distinguish from similar members in the first described modular unit) the intermediate coupling member 38I is provided with a rightwardly extending shank 29 to make a tight sliding fit with the bore 16R in newly added rightwardly extending member 12BR. The shank 29 is threaded to receive a new rod 20R with coupling member attached.

By contrast, in FIG. 5 the rightwardly extending shank 20R is threaded into the right-hand coupling member.

To clamp the new unit in position, using the FIG. 4 alternative, a coupling member with rod 20R projecting therefrom is then inserted through the bores in bore 18R and into bore 16R and threaded into the member 29. If this is the last unit of the modular assembly then a coupling member is used similar to coupling member 28 at the other end and except for the projecting rod 20R with a flat end and an end cap 40 applied. However, if a further modular unit is to be added, the coupling member is used with a rightwardly projecting shank 29 and the coupling procedure heretofore described, repeated.

Construction at the right-hand end member of FIG. 5 differs from that shown in FIG. 4 by having the rod 20R threaded into the end coupling member 18R.

In all embodiments it should be noted that for sure assembly all connected rod and coupling members extending through an entire modular assembly, should be connected by threading in the same sense. This is to avoid the risk that tightening one threaded connection will loosen another. If because of friction or other cause tightening of one member could not loosen another then the requirement that all connected members be threaded in the same sense is no longer mandatory.

I claim:

1. An assembly system, designed to permit modular extension in a direction, using first members extending in such direction and second members extending perpendicular thereto; each modular unit being defined by a first member designed for extension perpendicular to such direction and one or more second members extending therefrom in one sense, and where, in a completed assembly, a second member is located on each side of a first member; assembly means comprising:

a bore extending through said first members in the intended extension direction a bore extending through said second members for axial alignment with said first member bore a rod designed and constructed to extend along such bore in said first member;

a coupling member designed for threaded connection to one end of such rod;

an extent of the connected coupling member and rod being arranged to extend through the bore in said second member when the rod is located in said first member bore said coupling members and said second members being designed so that, with said rod retained against movement toward said coupling member relative to said first member, the screwing of said coupling onto said rod will move such second member along said rod toward said first member; whereby said coupling member is designed to clamp such second member to such first member, means on such coupling member designed in said clamped position to prevent translational movement of either the first or the second clamped members relative to said coupling member in a direction transverse to said rod; and means on said coupling member designed, in said clamped position of said member, to prevent rotation between said clamped members about any axis nonparallel to the rod.

2. An assembly of a plurality of pairs mutually perpendicular members designed for modular extension in a direction parallel to one of said sets, using first members extending in such direction and second members extending perpendicular thereto; each modular unit being defined by a member designed for extension perpendicular to such direction, and one or more second members extending therefrom in one sense; assembling means comprising:

at least one first bore extending through each of such first members in the intended modular extension direction a second bore extending through each of said second members arranged for alignment with a first bore;

a rod designed and constructed to extend along a first bore, coupling means for coupling a first member and a second member at one end of said rod, means for limiting movement of said rod toward said one end relative to the first bore, said coupling means and said rod being designed for threaded connection;

said coupling members and said second members being designed so that with a portion of the assembled coupling member and rod extending through the bore in said second member such coupling may be screwed onto said rod to move such second member along said rod into clamped relationship with the first member;

means on such coupling member designed, in such clamped position, to prevent translational movement of either a first or a second clamped member relative to said coupling member, in a direction transverse to said rod; and means on said coupling member designed, in said clamped position, to prevent rotation between said clamped members about any axis nonparallel to the rod.

3. An assembly as claimed in claim 2 wherein the end of said rod remote from said coupling means is designed for threaded connection with a coupling means connected to clamp, a second member to said first member at the end of the first member remote from the first-mentioned coupling means, and said remote end coupling means is designed to threadedly connect to a rod extending therefrom in the modular extension direction whereby another first member with rod extending through the first bore thereof may be clamped to another second member on the modular extension side of the last-mentioned first member.

4. An assembly as claimed in claim 3 wherein said first and second members are designed so that in clamped relationship, a planar end face of a clamped first member abuts a planar side face of the second member clamped thereto, and said planar faces are transverse to the modular extension direction.

5. An assembly as claimed in claim 3 wherein threadedly connected rods extend through aligned bores in a plurality of said units from a coupling means clamping a second member at one end of said plurality to a first member, to a coupling means clamping a second member to a first member at the other end of said plurality of units.

6. An assembly as claimed in claim 3 wherein the means limiting movement of said rod toward said one end comprises a threaded connection between a second coupling member and said rod at the end of said rod remote from the first-mentioned coupling member, whereby said second coupling member may be screwed on said rod to clamp together second and first members adjacent said other end of said rod.

7. An assembly as claimed in claim 3 wherein said coupling member includes a shank adapted to make a close sliding fit with the walls defining an extent of each of the aligned bores of the clamped first and second members.

8. An assembly as claimed in claim 3 wherein said coupling means includes a shank adapted to make a close sliding fit with the walls defining an extent of each of the aligned bores of the clamped first and second members, and an enlargement of said shank providing a shoulder facing the rod to which said coupling member is attached, and wherein the bore in a second member is enlarged to provide a cooperating oppositely facing shoulder to receive bearing pressure from the shoulder of said coupling member.

9. An assembly as claimed in claim 3 wherein said coupling member includes a shank for making threaded connection with said rod and an enlargement on said shank providing a shoulder facing the rod to which said coupling member is attached, and wherein the bore in a second member is enlarged to provide a cooperating oppositely facing shoulder to receive bearing pressure from the shoulder of said coupling member.

10. An assembly as claimed in claim 1 wherein said first and second members are designed so that in clamped relationship, a planar end face of a clamped first member abuts a planar side face of the second member clamped thereto, and said planar faces are transverse to the modular extension direction.

11. An assembly as claimed in claim 2 wherein threadedly connected rods extend through aligned bores in a plurality of said units from a coupling means clamping a second member at one end of said plurality to a first member, to a coupling means clamping a second member to a first member at the other end of said plurality of units.

12. An assembly as claimed in claim 2 wherein the means limiting movement of said rod toward said one end comprises a threaded connection between a second coupling member and said rod at the end of said rod remote from the first-mentioned coupling member, whereby said second coupling member may be screwed on said rod to clamp together second and first members adjacent said other end of said rod.

13. An assembly as claimed in claim 1 wherein said coupling member includes a shank adapted to make a close sliding fit with the walls defining an extent of each of the aligned bores of the clamped first and second members.

14. An assembly as claimed in claim 1 wherein said coupling means includes a shank adapted to make a close sliding fit with the walls defining an extent of each of the aligned bores of the clamped first and second members, and an enlargement of said shank providing a shoulder facing the rod to which said coupling member is attached, and wherein the bore in a second member is enlarged to provide a cooperating oppositely facing shoulder to receive bearing pressure from the shoulder of said coupling member.

15. An assembly as claimed in claim 1 wherein said coupling member includes a shank for making threaded connection with said rod and an enlargement on said shank providing a shoulder facing the rod to which said coupling member is attached, and wherein the bore in a second member is enlarged to provide a cooperating oppositely facing shoulder to receive bearing pressure from the shoulder of said coupling member.

16. An assembly as claimed in claim 2 wherein said first and second members are designed so that in clamped relationship, a planar end face of a clamped first member abuts a planar side face of the second member clamped thereto, and said planar faces are transverse to the modular extension direction.

17. An assembly as claimed in claim 2 wherein threadedly connected rods extend through aligned bores in a plurality of said units from a coupling means clamping a second member at one end of said plurality to a first member, to a coupling means clamping a second member to a first member at the other end of said plurality of units.

18. An assembly as claimed in claim 2 wherein said coupling member includes a shank adapted to make a close sliding fit with the walls defining an extent of each of the aligned bores of the clamped first and second members.

19. An assembly as claimed in claim 2 wherein said coupling means includes a shank adapted to make a close sliding fit with the walls defining an extent of each of the aligned bores of the clamped first and second members, and an enlargement of said shank providing a shoulder facing the rod to which said coupling member is attached, and wherein the bore in a second member is enlarged to provide a cooperating oppositely facing shoulder to receive bearing pressure from the shoulder of said coupling member.

20. An assembly as claimed in claim 2 wherein said coupling member includes a shank for making threaded connection with said rod and an enlargement on said shank providing a shoulder facing the rod to which said coupling member is attached, and wherein the bore in a second member is enlarged to provide a cooperating oppositely facing shoulder to receive bearing pressure from the shoulder of said coupling member.